United States Patent
Burbank et al.

(10) Patent No.: US 7,379,277 B2
(45) Date of Patent: May 27, 2008

(54) READER SHIELD/ELECTRODE STRUCTURE FOR IMPROVED STRAY FIELD AND ELECTRICAL PERFORMANCE

(75) Inventors: Daniel Paul Burbank, Minneapolis, MN (US); Declan Macken, Prior Lake, MN (US); Harry Sam Edelman, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 351 days.

(21) Appl. No.: 11/172,350

(22) Filed: Jun. 30, 2005

(65) Prior Publication Data

US 2007/0002502 A1    Jan. 4, 2007

(51) Int. Cl.
*G11B 5/33*    (2006.01)
(52) U.S. Cl. ..................................... 360/319
(58) Field of Classification Search ............... 360/319, 360/317, 123, 124, 125, 126, 324.11, 323
See application file for complete search history.

(56) References Cited

U.S. PATENT DOCUMENTS

| | | | |
|---|---|---|---|
| 5,208,715 A | | 5/1993 | Mowry |
| 5,761,009 A | * | 6/1998 | Hughbanks et al. ........ 360/323 |
| 5,872,691 A | * | 2/1999 | Fukuyama et al. ......... 360/319 |
| 5,986,856 A | | 11/1999 | Macken et al. |
| 6,097,578 A | | 8/2000 | Pokhil |
| 6,222,702 B1 | | 4/2001 | Macken et al. |
| 6,496,334 B1 | | 12/2002 | Pang et al. |
| 6,597,545 B2 | | 7/2003 | Macken et al. |
| 6,680,829 B2 | | 1/2004 | Chen et al. |
| 6,680,832 B2 | | 1/2004 | Fontana, Jr. et al. |
| 6,700,760 B1 | | 3/2004 | Mao |
| 6,731,475 B2 | | 5/2004 | Ikeda |
| 6,738,233 B2 | | 5/2004 | Khizroev et al. |
| 6,801,409 B2 | | 10/2004 | Michel et al. |
| 6,879,471 B2 | * | 4/2005 | Heim et al. ................. 360/319 |
| 2003/0214765 A1 | | 11/2003 | Ghaly et al. |
| 2004/0061986 A1 | * | 4/2004 | Kagami et al. ......... 360/324.11 |
| 2005/0024771 A1 | * | 2/2005 | Le ............................. 360/126 |
| 2005/0185345 A1 | * | 8/2005 | Ding et al. ................. 360/319 |
| 2005/0264947 A1 | * | 12/2005 | Nishiyama .................. 360/319 |

FOREIGN PATENT DOCUMENTS

JP         05266435 A    * 10/1993

* cited by examiner

*Primary Examiner*—Tianjie Chen
(74) *Attorney, Agent, or Firm*—Kinney & Lange, P.A.

(57) ABSTRACT

A magnetic sensing device includes a first electrode, a second electrode, a first magnetic shield, a second magnetic shield, and a sensor. The first magnetic shield forms at least a portion of the first electrode. The second magnetic shield includes a first region that forms at least a portion of the first electrode and a second region that forms at least a portion of the second electrode. The sensor is positioned between the first and second magnetic shields and is electrically connected in series between the first and second electrodes.

12 Claims, 7 Drawing Sheets

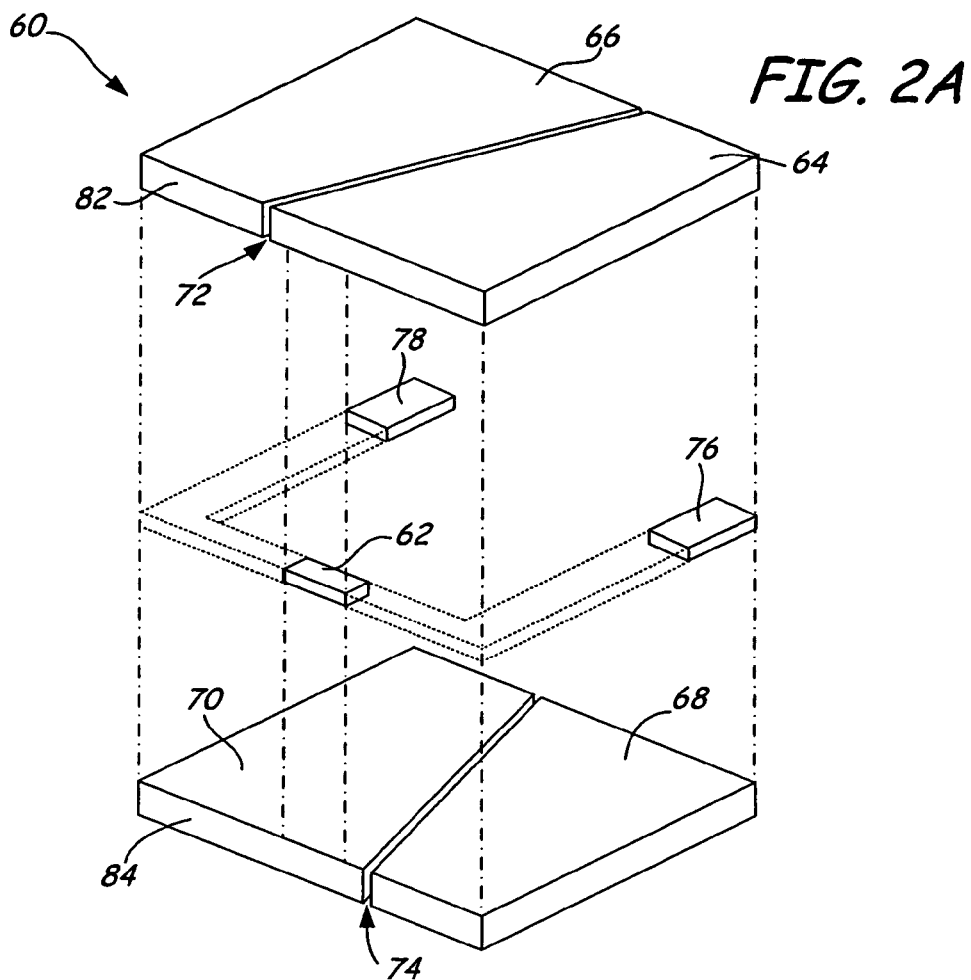
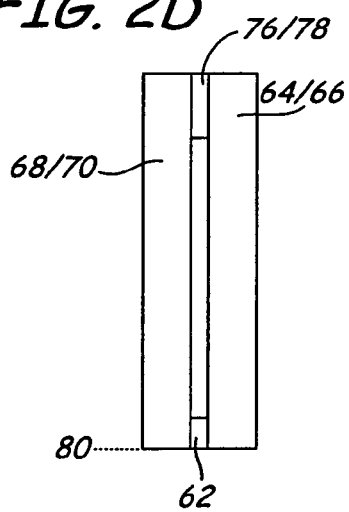
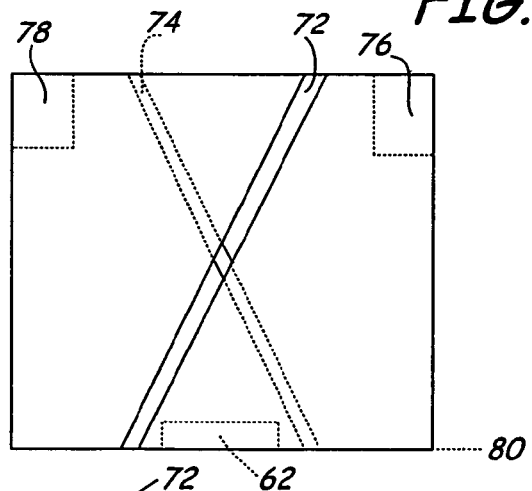
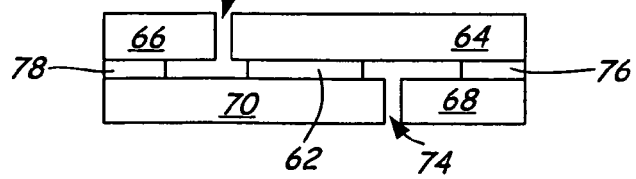

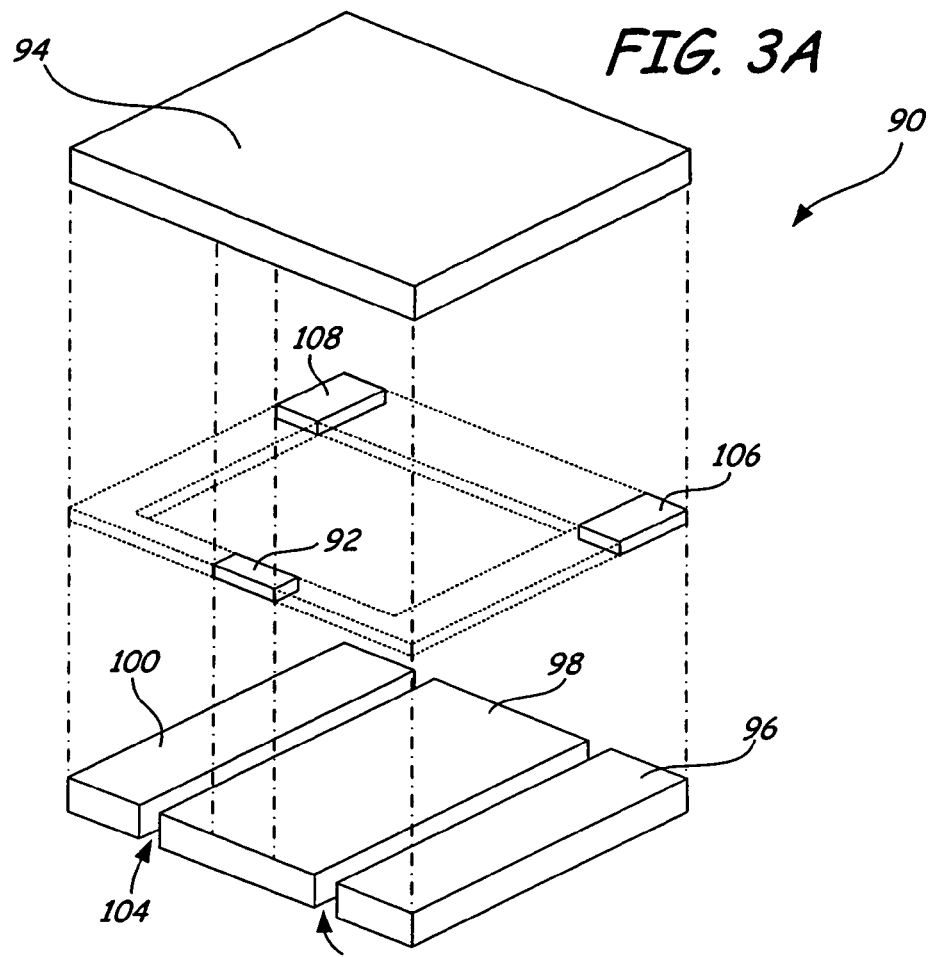
FIG. 3A
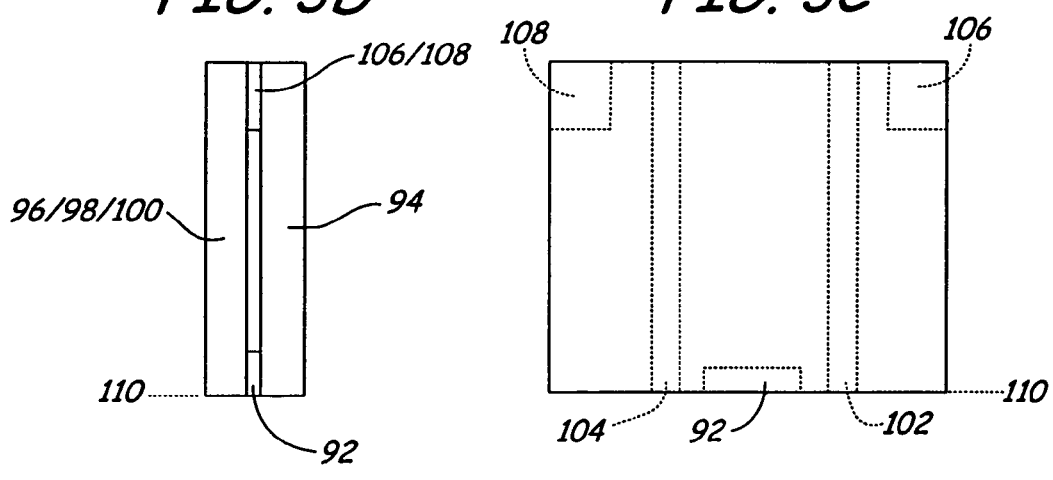
FIG. 3D
FIG. 3C
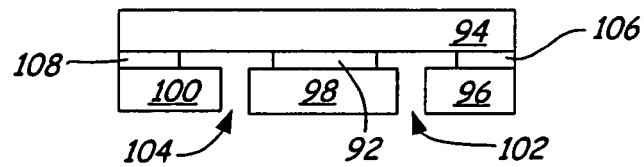
FIG. 3B

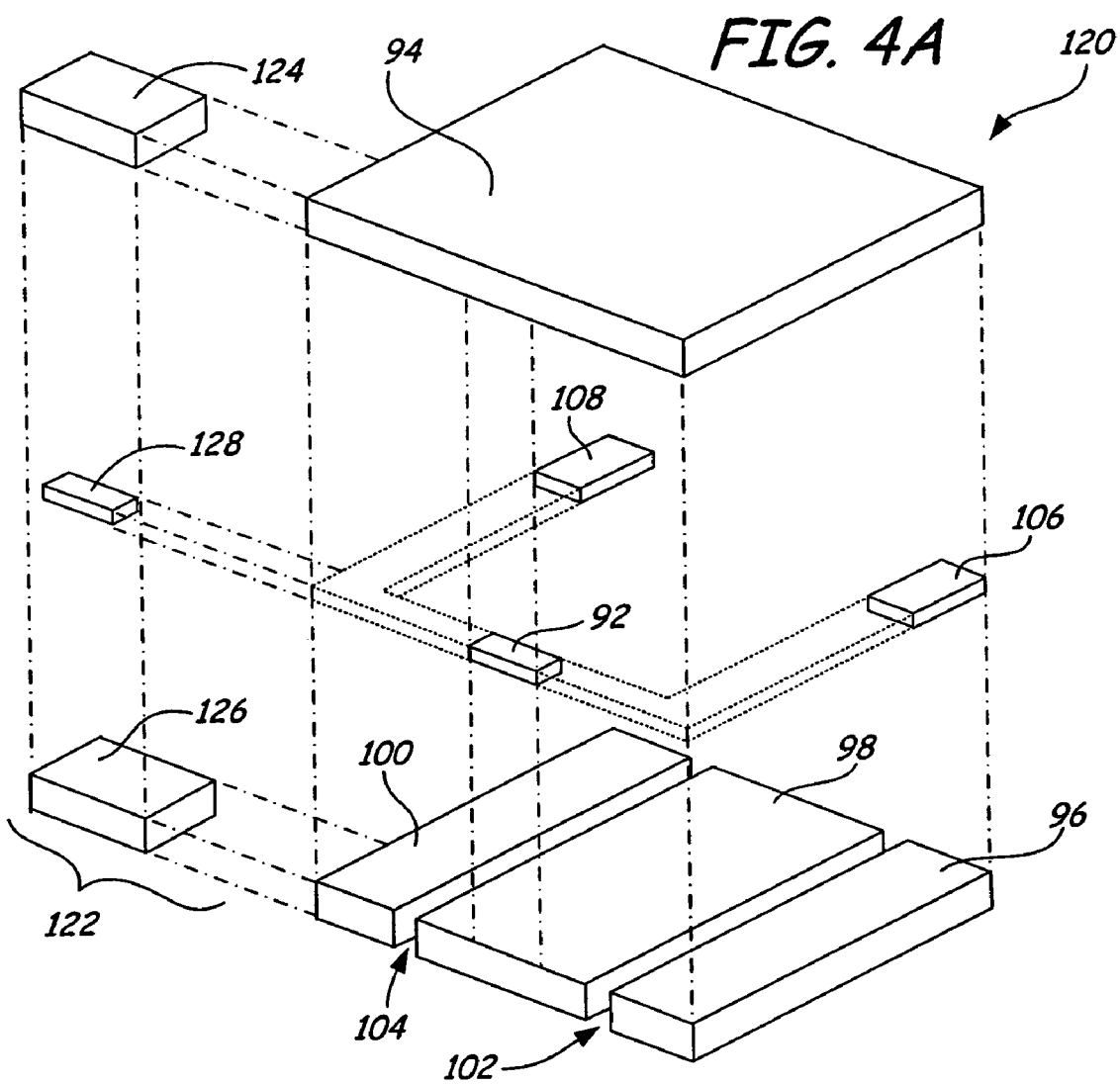

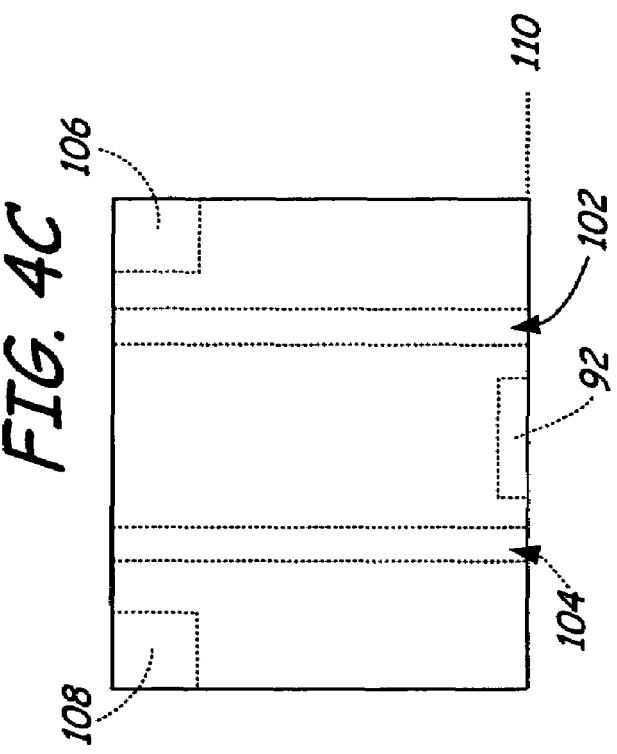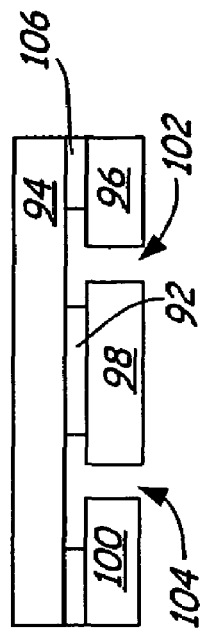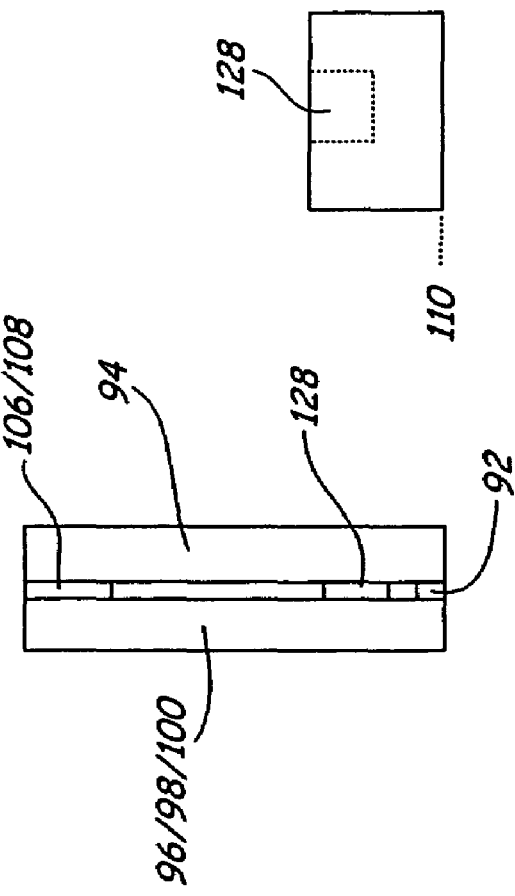

READER SHIELD/ELECTRODE STRUCTURE FOR IMPROVED STRAY FIELD AND ELECTRICAL PERFORMANCE

BACKGROUND OF THE INVENTION

The present invention relates generally to the field of magnetic data storage and retrieval systems. In particular, the present invention relates to a magnetic read head having a shield/electrode structure in which the magnetic and electrical functions thereof have been separated from one another.

In a magnetic data storage and retrieval system, a magnetic recording head typically includes a reader portion, or read head, having a magnetoresistive (MR) sensor for retrieving magnetically encoded information stored on a magnetic medium, such as a magnetic disc. To retrieve information from a track of the magnetic disc, the read head is positioned over that track as the disc is rotated at a high speed. This rotation causes the read head to be supported over an air bearing surface (ABS) of the magnetic disc by a thin cushion of air. To ensure that the MR sensor reads only the information that is stored directly beneath it on a specific track of the magnetic disc, first and second magnetic shields are placed on either side of the MR sensor.

During a read operation, magnetic flux from the surface of the disc causes rotation of the magnetization vector of a sensing layer or layers of the MR sensor, which in turn causes a change in electrical resistivity of the MR sensor. The change in resistivity of the MR sensor can be detected by passing a current through the MR sensor and measuring a voltage across the MR sensor. Depending on the geometry of the device, the sense current may be passed in the plane (CIP) of the layers of the device or perpendicular to the plane (CPP) of the layers of the device.

To provide current to the MR sensor of a CPP read head, the first and second magnetic shields conventionally perform double duty as both magnetic shields and electrodes. Optimization of the various electrical and magnetic functions required of the magnetic shields for a CPP MR sensor requires conflicting demands on their physical structure. There is thus a need for a magnetic shield/electrode structure for a MR sensor of a CPP read head in which both the magnetic and electrical functions of the CPP read head can be optimized.

BRIEF SUMMARY OF THE INVENTION

A magnetic sensing device in accord with the present invention includes a first electrode, a second electrode, a first magnetic shield, a second magnetic shield, and a sensor. The first magnetic shield forms at least a portion of the first electrode. The second magnetic shield includes a first region that forms at least a portion of the first electrode and a second region that forms at least a portion of the second electrode. The sensor is positioned between the first and second magnetic shields and is electrically connected in series between the first and second electrodes.

BRIEF DESCRIPTION OF THE DRAWINGS

FIG. 2A is an exploded perspective view, FIG. 2B is a medium-facing view, FIG. 2C is a top view, and FIG. 2D is a side view of a magnetic shield/electrode structure in accord with a first embodiment of the present invention for a CPP MR sensor.

FIG. 3A is an exploded perspective view, FIG. 3B is a medium-facing view, FIG. 3C is a top view, and FIG. 3D is a side view of a magnetic shield/electrode structure in accord with a second embodiment of the present invention for a CPP MR sensor.

FIG. 4A is an exploded perspective view, FIG. 4B is a medium-facing view, FIG. 4C is a top view, and FIG. 4D is a side view of a magnetic shield/electrode structure in accord with a third embodiment of the present invention for a CPP MR sensor.

DETAILED DESCRIPTION

Figure 1:
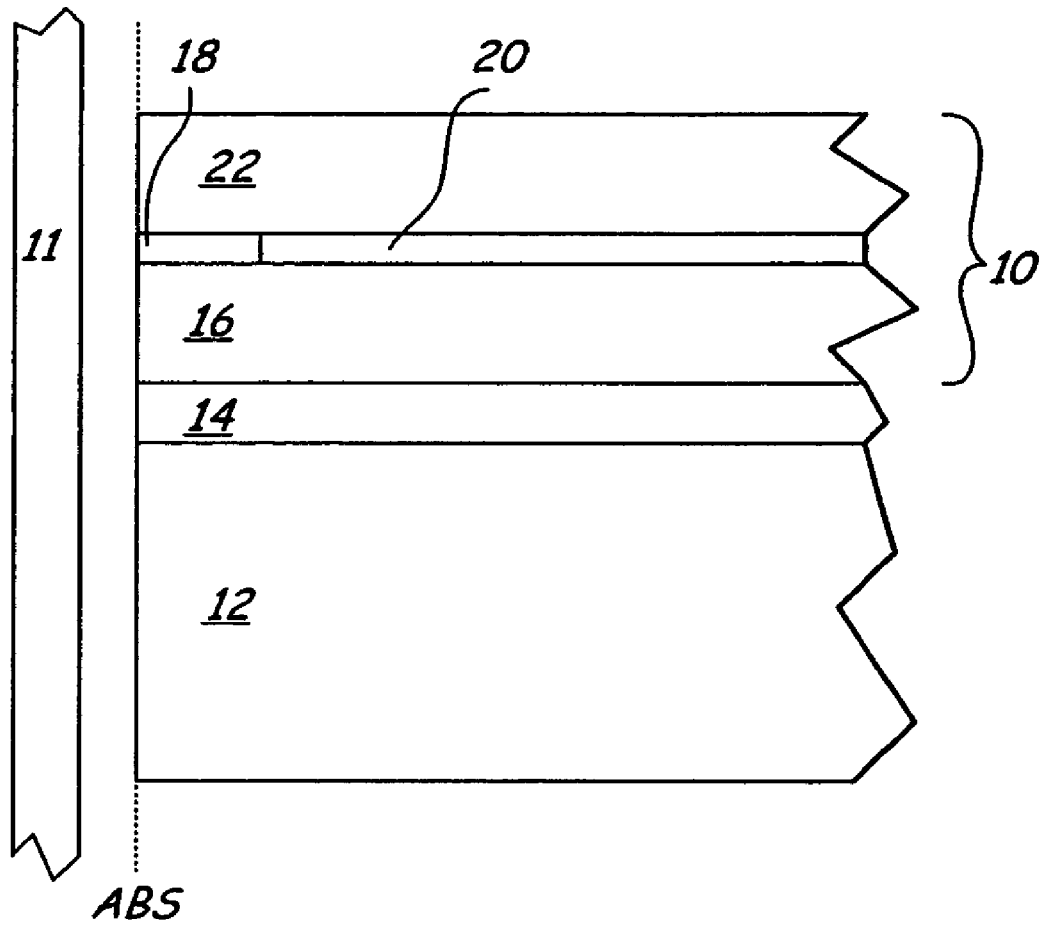
FIG. 1 is a cross-section view of a magnetic read head and a magnetic disc taken along a plane substantially normal to an air bearing surface (ABS) of the magnetic read head.

FIG. 1 is a cross-sectional view of magnetic read head 10 and magnetic disc 11 taken along a plane substantially normal to an air bearing surface (ABS) of magnetic read head 10. Magnetic disc 11 may be either a perpendicular or longitudinal recording media, with magnetic read head 10 corresponding thereto. Magnetic read head 10 is carried on slider body 12 and separated therefrom by gap 14. Magnetic read head 10 includes first magnetic shield 16, current-perpendicular-to-plane (CPP) magnetoresistive (MR) sensor 18, insulating layers 20, and second magnetic shield 22. CPP MR sensor 18 and insulating layers 20 are positioned between bottom and top shields 16 and 22, with MR sensor 18 being adjacent the ABS of magnetic head 10.

To provide current to CPP MR sensor 18, first and second magnetic shields 16 and 22 conventionally perform double duty as both magnetic shields and electrodes. Thus, first and second magnetic shields 16 and 22 are forced to serve the dual functions of providing electrical connection to MR sensor 18 and providing magnetic shielding from stray magnetic fields. Design goals for optimizing these two functions include the minimization of: (1) stray field sensitivity, (2) the likelihood of MR sensor short circuits at the ABS, (3) shield-to-shield (technically, electrode-to-electrode) capacitance, and (4) capacitive pickup of noise. As detailed below, it is nearly impossible to fully optimize all four of these goals in designing prior art magnetic shield/electrode structure 50.

I. Stray Field Sensitivity

First and second magnetic shields 16 and 22 of magnetic head 10 ideally permit remanent magnetic fields from a selected track of magnetic media 11 to reach CPP MR sensor 18, while preventing stray magnetic fields originating elsewhere from reaching MR sensor 18. Consequences of MR sensor 18 picking up stray magnetic fields are alteration of the sensor's bias point, the addition of noise to the signal sensed from the selected track, a decreased signal-to-noise ratio, and a greater probability that errors will occur in reading back the data recorded on the selected track. Experimental investigations have shown that magnetic shields 16 and 22 having too narrow a cross-track direction width have poor stray field rejection. It has further been shown that shields 16 and 22 will better reject stray fields if their edges (or at least the ABS and aback edge opposite the ABS) are coincident with each other. By coincident edges, it is meant that corresponding edges of the shields lie in the same plane as each other. Thus, to improve stray field rejection, first and second magnetic shields 16 and 22 are preferably wide shields having coincident edges at least at the ABS and the back edge.

II. MR Sensor Short Circuits

Slider body 12 upon which read head 10 is disposed is maintained in close proximity to disc 11, with first and second magnetic shields 16 and 22 being the closest held elements to magnetic disc 11. As a result, any surface imperfection on disc 11, such as an asperity, can result in a momentary contact between read head 10 and spinning disc 11. This contact can damage first and second magnetic shields 16 and 22, resulting in a metallic smear from one to the other. Further, this resultant smear may have an electrical resistance low enough to effectively short circuit MR sensor 18, thus rendering read head 10 inoperable. The probability of a damaging event depends on many factors, but is clearly proportional to a cross-track width of first and second magnetic shields 16 and 22. Thus, reducing the probability of a short circuit of MR sensor 18 at the ABS requires narrow shields.

III. Electrode-To-Electrode Capacitance

Because first and second magnetic shields 16 and 22 of CPP MR sensor 18 serve as the electrical connections to MR sensor 18, they essentially form a capacitor. In an electrical circuit representation of read head 10, this electrode-to-electrode capacitor appears in parallel with a resistance of MR sensor 18, thus limiting the bandwidth of MR sensor 18 at high frequencies. At a given disc rotational velocity, the bandwidth of MR sensor 18 imposes a substantial limit on the number of magnetic transitions allowed per track length, and consequently, on the real data storage density of magnetic disc 11. To improve the high frequency response of MR sensor 18, it is important that this electrode-to-electrode capacitance be minimized, which in turn requires that an overlapping area of first and second magnetic shields 16 and 22 be minimized.

IV. Capacitive Pickup of Noise

Not only do first and second magnetic shields (electrodes) 16 and 22 form a capacitor between each other, but each also forms a capacitor between itself and slider body 12 upon which read head 10 is formed. The capacitance of each electrode-to-slider body capacitor is determined mostly by the area of a slider body-facing surface of the shield (electrode) and the spacing between the two. A further capacitance is added between each of shields (electrodes) 16 and 22 and magnetic disc 11, with the capacitance of each being primarily dependent upon the area on the ABS of the shield (electrode).

In the electrical circuit representative of read head 10, MR sensor 18 appears in parallel with the capacitor formed between first and second magnetic shields (electrodes) 16 and 22. The additional capacitances introduced by each of shields (electrodes) 16 and 22 appear at opposite ends of MR sensor 18 between MR sensor 18 and a ground terminal. A preamplifier (not shown) configured to differentially amplify a voltage across MR sensor 18 rejects any interference that appears simultaneously as voltages on both shields (electrodes) 16 and 22 (i.e., "common mode" noise). However, if the two electrode-to-slider body (and electrode-to-magnetic disc) capacitances are not equal, noise will be capacitively coupled unequally to the inputs of the preamplifier, appearing as differential mode noise and degrading the signal-to-noise ratio of the MR sensor signal.

In a conventional configuration of read head 10, one of first and second shields (electrodes) 16 and 22 is positioned much closer to slider body 12 than the other, with the result being that the two electrode-to-slider body capacitances are unequal. One method for balancing these electrode-to-slider body capacitances is by adding a balancing capacitor electrically coupled between one of shields (electrodes) 16 and 22 and a slider "bond pad" used for external connection to a power source. But, this added capacitance also increases the electrode-to-electrode capacitance caused between shields (electrodes) 16 and 22. Thus, the addition of a balance capacitor to minimize electrode-to-slider body capacitance (and improve rejection of noise) extracts a penalty in the high frequency response of MR sensor 18.

A second way to equalize the electrode-to-slider body capacitances is to vary a size of first and second magnetic shields (electrodes) 16 and 22 such that the first shield (electrode) 16 closest to slider body 12 is smaller than second shield (electrode) 22 farthest from the slider body 12. Thus, reducing electrode-to-slider body capacitance mismatch to improve common mode rejection requires first and second shield (electrodes) 16 and 22 to have non-coincident edges.

Another contributor to the capacitive pickup of noise is the mismatched electrode-to-disc capacitances of first and second magnetic shield 16 and 22. This mismatch is caused by differences in the areas on the ABS of first and second shields (electrodes) 16 and 22s. Thus, reducing electrode-to-disc capacitive mismatch requires that the ABS cross-sectional areas of shields (electrodes) 16 and 22 to be equal.

V. Additional Factors

To enhance their shielding performance, first and second magnetic shields 16 and 22 preferably each have a width (measured in the plane of the ABS) to depth (measured normal to the ABS) ratio sufficient to provide a shape anisotropy in shields 16 and 22 that makes it difficult to saturate the magnetization of shields 16 and 22.

To further enhance the shielding performance of shields 16 and 22, domain wall movement near the areas of shields 16 and 22 adjacent MR sensor 18 is preferably avoided. The ideal width-to-height ratio to prevent such domain wall movement is dependent upon various material characteristics including anisotropy, magnetic moment, and film thicknesses. However, it has been found that, for any material, the ideal height of shields 16 and 22 should equal the height of one or two domain periods for any feature width. This can be determined by calculation or by empirical study of domains on rectangular features of varying width and height. Thus, shields 1b and 22 are also preferably short in the direction perpendicular to the ABS.

In sum, minimization of stray field sensitivity requires shields 16 and 22 to be wide and short and to have coincident edges (at least at the ABS and back edge), minimization of the likelihood of shorts of MR sensor 18 requires narrow shields 16 and 22, minimization of electrode-to-electrode capacitance requires shields 16 and 22 to have a small area, and minimization of capacitive pickup of noise requires shields 16 and 22 to have mismatched areas. With prior art designs, these requirements contradict each other, thus preventing optimization of all four design goals of first and second magnetic shields 16 and 22.

The present invention introduces a novel design for a magnetic shield/electrode structure that allows all four design goals specified above to be simultaneously optimized. Four embodiments of the present invention are described herein. FIGS. 2A, 2B, 2C, and 2D are views of magnetic shield/electrode structure 60 in accord with a first embodiment of the present invention for CPP MR sensor 62. In particular, FIG. 2A is an exploded perspective view, FIG. 2B is a medium-facing view, FIG. 2C is a top view, and FIG. 2D is a side view of structure 60. In these figures, insulation and spacing layers have been removed for clarity.

Magnetic shield/electrode structure 60 includes fragments 64, 66, 68, and 70; gaps 72 and 74, and electrical contacts 76 and 78, all of which come together in various combinations to form the magnetic shields and electrodes needed for MR sensor 62. In particular, coplanar fragments 64 and 66, which are spaced apart by gap 72, are magnetostatically coupled to each to form top shield 64/66. Similarly, coplanar fragments 68 and 70, which are spaced apart by gap 74, are magnetostatically coupled to each other to form bottom shield 68/70. Top shield 64/66 and bottom shield 68/70, which are separated from one another by spacing layers (not shown) to prevent exchange coupling, are positioned on opposite sides of MR sensor 62 to shield MR sensor 62 from magnetic fields. MR sensor 62 is positioned adjacent or near medium-facing surface 80 of structure 60 for receipt of magnetic fields from a medium (not shown), such as a magnetic disc, spaced a short distance from medium-facing surface 80.

Fragments 64 and 68 are electrically coupled to one another via contact 76 to form top electrode 64/68. Similarly, fragments 66 and 70 are electrically coupled to each other via contact 78 to form bottom electrode 66/70. Although not shown in the figures, contacts 76 and 78 extend away from MR sensor 62 to electrically connect electrodes 64/68 and 66/70 to an external power source in a conventional manner. Top electrode 64/68 and bottom electrode 66/70, which are otherwise electrically insulated from one another by gaps 72 and 74, supply current to MR sensor 62 in a direction perpendicular to a plurality of layers of MR sensor 62. Fragments 64, 66, 68, and 70 are shaped such that MR sensor 62 is physically between fragments 64 of top electrode 64/68 and fragment 70 of bottom electrode 66/70. In this way, current directly enters and leaves MR sensor 62 through fragments 64 and 70.

Fragments 64, 66, 68, and 70 are each preferably formed of an electrically-conductive material having high magnetic permeability and low coercivity. Gaps 72 and 74 are preferably formed of electrically-insulating material. Gaps 72 and 74 preferably have a width large enough to electrically decouple the fragments on either side thereof, but small enough to allow for the magnetostatic coupling of the fragments. Accordingly, this width is specific to the materials and dimensions used throughout magnetic shield/electrode structure 60. In most embodiments, gaps 72 and 74 will preferably have a width less than about 20 micrometers, but greater than zero. Contacts 76 and 78 are preferably formed of a non-magnetic, electrically-conductive material.

Magnetic shield/electrode structure 60 in accord with the present invention separates its magnetic and electrical properties, thereby allowing for optimization the design goals of minimizing: (1) stray field sensitivity, (2) the likelihood of MR sensor short circuits at the ABS, (3) electrode-to-electrode capacitance, and (4) shield capacitive pickup of noise.

I. Stray Field Sensitivity

As discussed above, to minimize stray field sensitivity of MR sensor 62, top shield 64/66 and bottom shield 68/70 are preferably wide, but short, shields having coincident edges (at least at medium-facing surface 80 and back surface 86 of structure 60 opposite medium facing surface 80). Here, fragments 64 and 66 behave magnetically as a single wide feature, namely top shield 64/66, and fragments 68 and 70 similarly behave magnetically as a single wide feature, namely bottom shield 68/70. Additionally, external edges 82 of top shield 64/66 are coincident with (or are coplanar with) external edges 84 of bottom shield 68/70. Thus, the design of magnetic shield/electrode 60 satisfies the first design goal, and allows for MR sensor 62 to have improved stray field sensitivity.

II. MR Sensor Short Circuits

Top shield 64/66 and bottom shield 68/70 are preferably narrow at medium-facing surface 80 of structure 60 to minimize the likelihood of a smear between shields 64/66 and 68/70 caused by contact with the medium spaced a short distance from medium-facing surface 80. Structure 60 accomplishes this goal. Because fragment 64 of top shield 64/66 and fragment 68 of bottom shield 68/70 are electrically coupled to one another, a smear that occurs between fragments 64 and 68 will not short circuit MR sensor 62. Similarly, no fear exists of a smear between fragments 66 and 70 short circuiting MR sensor 62. A small risk exists of a smear at skew between fragments 64 and 66 and between fragments 68 and 70. However, gaps 72 and 74 may be made wide enough to minimize this risk. Thus, the primary risk of a short circuit exists between fragment 64 of top shield 64/66 and fragment 70 of bottom shield 68/70. And then, this risk resides only in the area where there two fragments overlap one another, which need be only as wide as a width of MR sensor 62. This overlap is substantially more narrow than the width required of top shield 64/66 and bottom shield 68/70 to minimize stray field sensitivity.

III. Electrode-To-Electrode Capacitance

To improve the high frequency response of MR sensor 62, the electrode-to-electrode capacitance between top shield 64/66 and bottom shield 68/70 is preferably minimized. This goal has been accomplished with magnetic shield/electrode structure 60. The electrode-to-electrode capacitance is proportional to the area of overlap between top electrode 64/68 and bottom electrode 66/70, which here is very small in comparison to the area of overlap between top shield 64/66 and bottom shield 68/70.

Gap 72 of top shield 64/66 extends from medium-facing surface 80 towards back surface 86 of structure 60 opposite medium-facing surface 80 at an angle, such that fragment 64 is wider at medium-facing surface 80 than it is at back surface 86 while fragment 66 is narrower at medium-facing surface 80 than it is at back surface 86. Likewise, gap 74 of bottom shield 68/70 extends from medium-facing surface 80 toward back surface 86 at an angle, such that fragment 84 is narrower at medium-facing surface 80 than at back surface 86, while fragment 84 is wider at medium-facing surface 80 than at back surface 86. Thus, the only overlap between top electrode 64/68 and bottom electrode 66/70 is a small wedge between fragments 64 and 70.

IV. Capacitive Pickup of Noise

To minimize capacitive pickup of noise, which degrades the signal-to-noise ratio of MR sensor 62, any mismatches in the capacitances between each of top electrode 64/68 and bottom electrode 66/70 and the substrate (or slider body) upon which shield/electrode structure 60 is formed and in the capacitances between each of top electrode 64/68 and bottom electrode 66/70 and the medium likewise must be minimized. Magnetic shield/electrode 60 design allows for this goal to be met.

In magnetic shield/electrode structure 60, the two electrode-to-substrate capacitances can be equalized by equalizing both the areas of electrodes 64/68 and 66/70 and their spacing to the substrate. Here, the total area of fragments 64 and 68 of top electrode 64/68 can be substantially matched to the total area of fragments 66 and 70 of lower electrode 66/70. For instance, the area of fragment 64 can be matched to the area of fragment 70, and the area of fragment 66 can be matched to the area of fragment 68. Likewise, the spacing can be equalized between each of electrodes 64/68 and electrodes 66/70 and the substrate. The two electrode-to-medium capacitances can be equalized by equalizing the areas of top electrode 64/68 and bottom electrode 66/70 at medium-facing surface 80. Thus, magnetic shield/electrode 60 design allows for minimization of capacitive pickup of noise.

In sum, magnetic shield/electrode 60 allows for all four of the shield/electrode design goals listed above to be met by separating the electrical and magnetic functions thereof—thus enabling each to be optimized separately. The particular configuration of magnetic shield/electrode 60 is intended as exemplary of the invention only, and many alternative configurations are possible. Further, the present invention contemplates that some of the design goals may be sacrificed for other reasons.

FIGS. 3A, 3B, 3C, and 3D illustrate magnetic shield/electrode structure 90 in accord with a second embodiment of the present invention for CPP MR sensor 92. FIG. 3A is an exploded perspective view, FIG. 3B is a medium-facing view, FIG. 3C is a top view, and FIG. 3D is a side view of magnetic shield/electrode structure 90. In these figures, insulation and spacing layers have been removed for clarity.

Magnetic shield/electrode structure 90 includes fragments 94, 96, 98, and 100, gaps 102 and 104, and electrical contacts 106 and 108, all of which come together in various combinations to form the magnetic shields and electrodes needed for MR sensor 92. In particular, fragment 94 forms top shield 94, while coplanar fragments 96, 98, and 100, which are spaced apart by gaps 102 and 104, are magnetostatically coupled to each other to form bottom shield 96/98/100. Top and bottom shields 94 and 96/98/100, which are separated from one another by spacing layers (not shown) to prevent exchange coupling, are positioned on opposite sides of MR sensor 92 to shield MR sensor 92 from magnetic fields. MR sensor 92 is positioned adjacent or near medium-facing surface 110 of structure 90 for receipt of magnetic fields from a medium (not shown), such as a magnetic disc, spaced a short distance from medium-facing surface 110.

Fragments 94, 96, and 100 are electrically coupled to one another via contacts 106 and 108 to form top electrode 96/94/100. Fragment 98 simply forms bottom electrode 98. Although not shown in the figures, contacts 106 and 108 extend away from MR sensor 92 to electrically connect top electrode 96/94/100 to an external power source in a conventional manner. Bottom electrode 98 is similarly connected to the external power source. Top electrode 96/94/100 and bottom electrode 98, which are otherwise electrically-insulated from one another by gaps 102 and 104, supply current to MR sensor 92 in a direction perpendicular to a plurality of layers of MR sensor 92. Fragments 94, 96, 98, and 100 are shaped such that MR sensor 92 is physically between fragments 94 of top electrode 96/94/100 and bottom electrode 98. In this way, current directly enters and leaves MR sensor 92 through fragments 94 and 98.

Fragments 94, 96, 98, and 100 are each preferably formed of an electrically-conductive material having high magnetic permeability and low coercivity. Gaps 102 and 104 are preferably formed of electrically-insulating material. Gaps 102 and 104 preferably have a width large enough to electrically decouple the fragments on either side thereof, but small enough to allow for the magnetostatic coupling of the fragments. Accordingly, this width is specific to the materials and dimensions used throughout magnetic shield/electrode structure 90. In most embodiments, gaps 102 and 104 will preferably have a width less than about 20 micrometers, but greater than zero. Contacts 106 and 108 are preferably formed of a nonmagnetic, electrically-conductive material.

Magnetic shield/electrode structure 90 meets most of the above-listed design goals. Top shield 94 and bottom shield 96/98/100 are wide shields having coincident edges (at least at medium-facing surface 110 and a back surface opposite surface 110) to reduce stray field sensitivity. The risk of short circuits is limited to a relatively short width between fragments 94 and 104. The electrode-to-electrode capacitance in structure 90 is greater than the electrode-to-electrode capacitance in structure 60, but still less than in prior art designs. Electrode-to-disc capacitance can be partially equalized by top electrode 96/94/100 being thinner than bottom electrode 98. However, the electrode-to-substrate capacitance of this embodiment suffers over that of magnetic shield/electrode structure 60. This increase in capacitance common mode pickup is the result of a simpler top shield design. Certain manufacturing methods make it difficult to form a gap in the top shield of a magnetic head. In those applications, this solution may be preferred as it still provides many benefits over prior art designs.

FIGS. 4A, 4B, 4C, and 4D illustrate magnetic shield/electrode structure 120 in accord with a third embodiment of the present invention. Because of the similarity in shield/electrode structures 90 and 120, common elements between the two are like numbered. FIG. 4A is an exploded perspective view, FIG. 4B is a medium-facing view, FIG. 4C is a top view, and FIG. 4D is a side view of magnetic shield/electrode structure 120 in accord with the present invention for CPP MR sensor 92.

Structure 120 introduces a minor modification of magnetic shield/electrode structure 90 to reduce the capacitive common mode pickup at the expense of a slight gain in differential capacitance. Specifically, structure 120 adds dummy element 122 having segments 124 and 126 and electrical contact 128 positioned therebetween. Segment 124 is coplanar with segment 94, while segment 126 is coplanar with segments 96, 98, and 100. Dummy element 122 is electrically coupled to bottom electrode 98, but magnetically insulated from top shield 94 and bottom shield 96/98/100.

The area of dummy element 122 adds to the capacitance of lower electrode 98, making it possible to accurately balance the electrode-to-substrate capacitances. Additionally, Because of the additional area at media-facing surface 110, a thickness of top shield 94 can be increased without significantly unbalancing the electrode-to-disk capacitances.

Figure 5A:
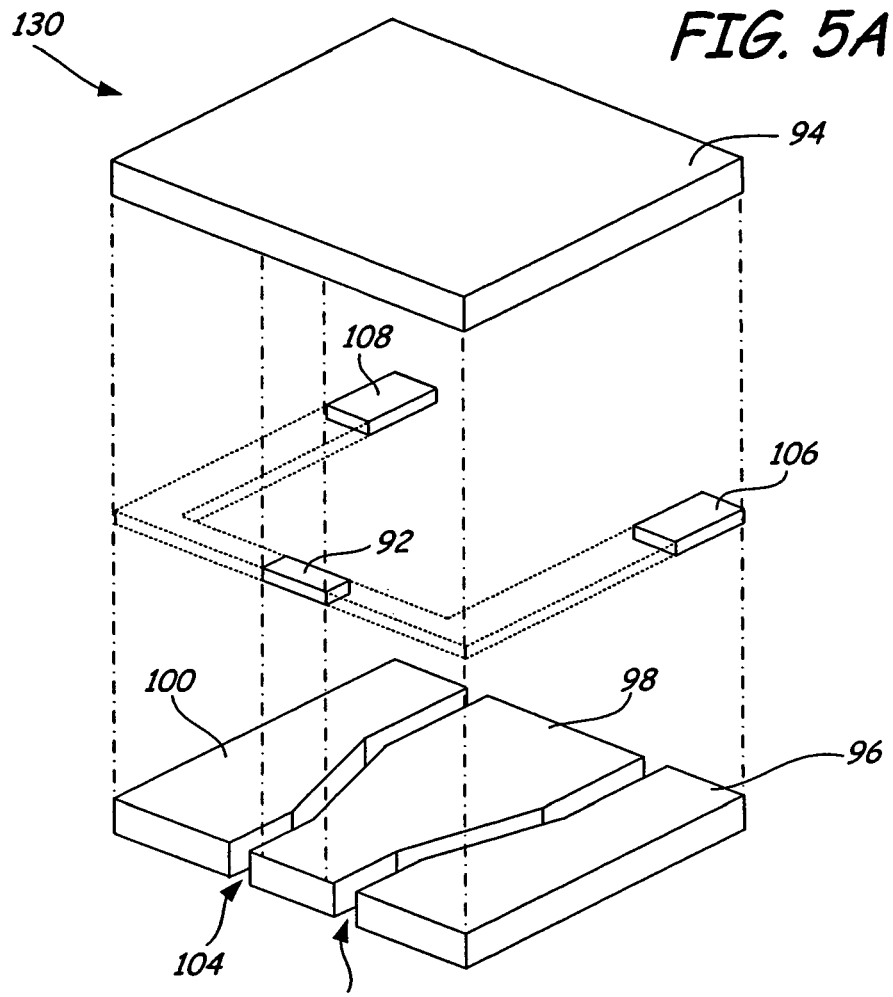
FIG. 5A is an exploded perspective view.
Figure 5D:
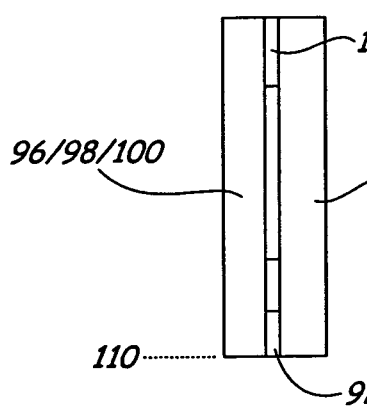
FIG. 5D is a side view of a magnetic shield/electrode structure in accord with a fourth embodiment of the present invention for a CPP MR sensor.
Figure 5C:
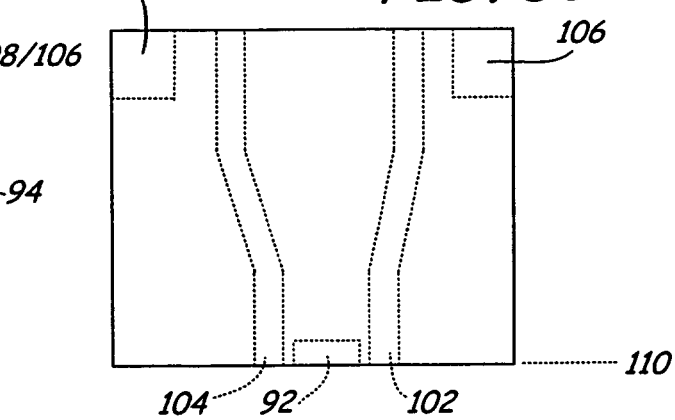
FIG. 5C is a top view.
Figure 5B:
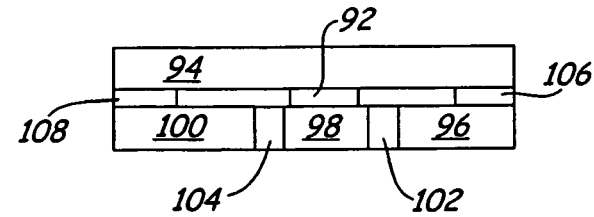
FIG. 5B is a medium-facing view.

FIGS. 5A, 5B, 5C, and 5D present a minor modification of magnetic shield/electrode structure 90. Because of the similarities in shield/electrode structures 90 and 120, common elements between the two are like numbered. FIG. 5A is an exploded perspective view, FIG. 5B is a medium-facing view, FIG. 5C is a top view, and FIG. 5D is a side view of magnetic shield/electrode structure 130 in accord with a fourth embodiment of the present invention for MR sensor 92.

Magnetic shield/electrode structure 130 is nearly identical to structure 90, with the change being the geometric shape of segments 96, 98, and 100. In this change, the width of segment 98 of structure 130 is reduced over that in structure 90, while the widths of segment 96 and 100 of structure 130 are increased over that of structure 90. This modification will further reduce the likelihood of short circuits of MR sensor 92 caused by smearing.

Experiment Results

Figure 6:
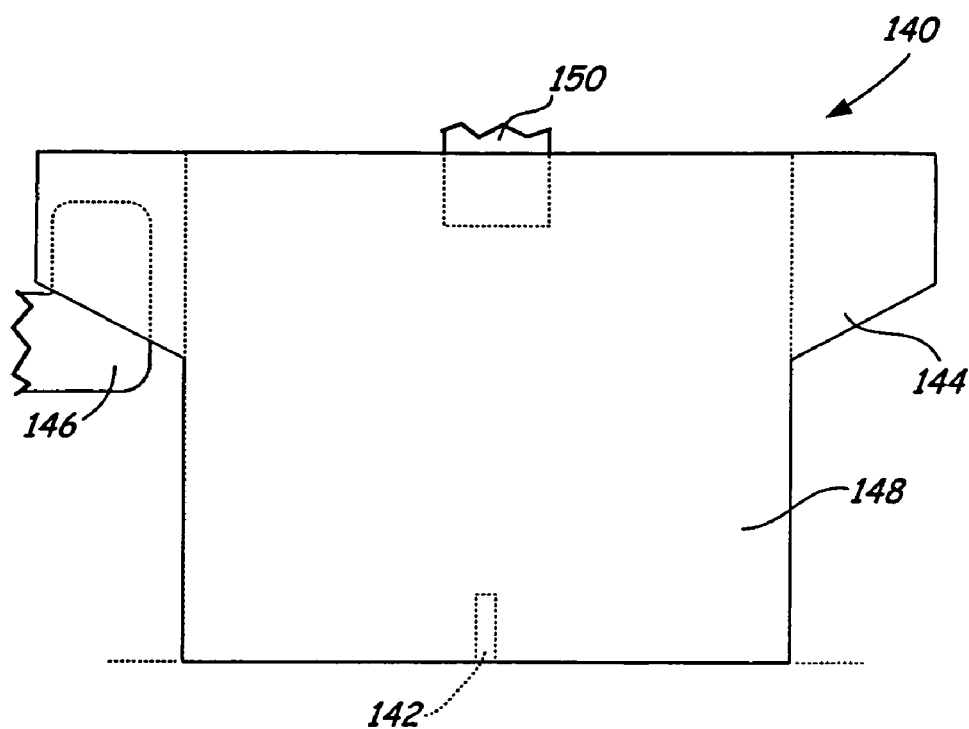
FIG. 6 is a top view of a prior art magnetic shield/electrode structure for a CPP MR sensor.

FIG. 6 is a top view of prior art magnetic shield/electrode structure 140 for CPP MR sensor 142. Structure 140 includes top shield 144, top shield contact 146, bottom shield 148, and bottom shield contact 150. MR sensor 142 is positioned between top and bottom shields 144 and 148 adjacent a media bearing surface structure 140. Top shield contact 146 electrically couples top shield 144 to an external power source. Likewise, bottom shield contact 150 electrically couples bottom shield 148 to an external power source. Top and bottom shields 144 and 148 double as electrodes for MR sensor 142, and thus, are electrically insulated from one another, except through MR sensor 142.

Figure 7:
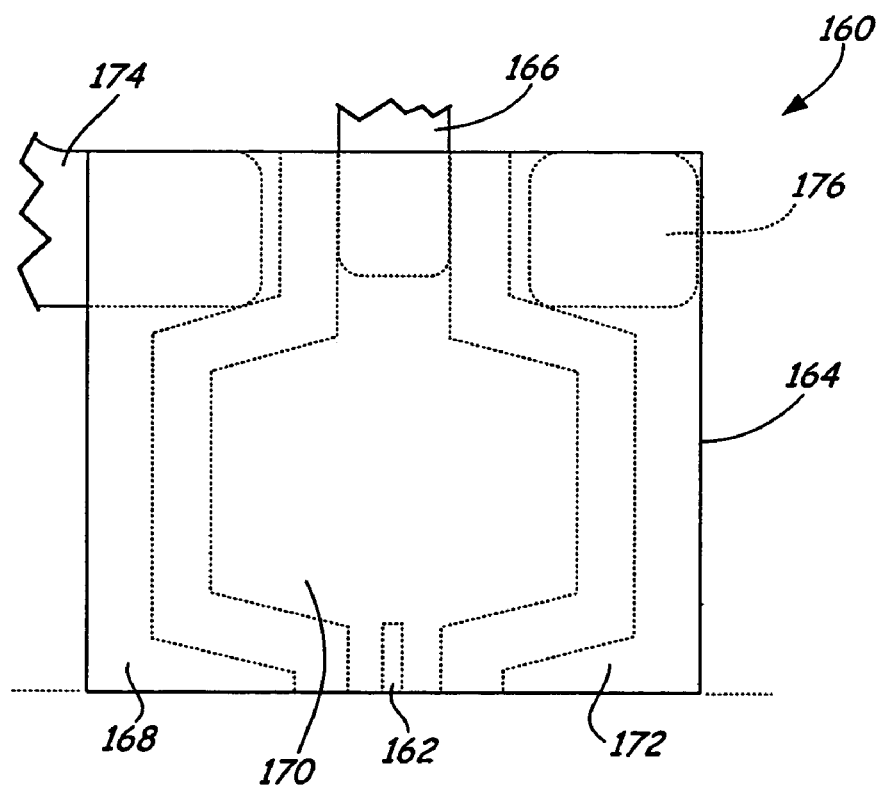
FIG. 7 is a top view of a magnetic shield/electrode structure in accord with the present invention for a CPP MR sensor.

FIG. 7 is a top view of magnetic shield/electrode structure 160 in accord with the present invention for CPP MR sensor 162. Structure 160 includes top shield 164; top shield contact 166; first, second, and third bottom shield fragments 168, 170, and 172; and first and second bottom shield contacts 174 and 176. MR sensor 162 is positioned between top shield 164 and second bottom shield fragment 170 adjacent a media facing surface of structure 160. Top shield contact 166 electrically couples top shield 164 to an external power source, thereby forming top electrode 164. First, second, and third bottom shield fragments 168, 170, and 172 are coplanarly positioned with second bottom shield fragment 170 positioned between fragments 168 and 172. First and second bottom shield contacts 174 and 176 electrically couples top shield 164 to a respective one of first and third bottom shield fragments 168 and 172, thereby forming top electrode 168/164/172. First bottom shield contact 174 further serves to couple top electrode 168/164/172 to the external power source. Top electrode 164 and bottom electrode 168/164/172 are electrically insulated from one another, except through MR sensor 162.

Performance of prior art magnetic shield/electrode structure 140 of FIG. 6 was experimentally compared to the performance of magnetic shield/electrode structure 160 of FIG. 7 in accord with the present invention. In the experiment, structures 140 and 160 had equal widths. Because stray field sensitivity is more pronounced in perpendicular recording performance structures 146 and 160 were designed for reading from perpendicular recording medium. A test of reader sensitivity to externally applied fields shows that structures 140 and 160 had equal immunity to stray fields applied to an underlayer of the perpendicular recording medium. The experimental results further show that the electrode-to-electrode and electrode-to-substrate capacitances in structure 160 were substantially lower than those in structure 140. Little difference was seen in the electrode-to-medium capacitances in structures 140 and 160. Further, an overlap of between top electrode 168/164/172 and bottom electrode 170 is significantly less than the overlap between top and bottom electrodes 144 and 148 of structure 140; thus, the likelihood of a MR sensor short circuit will be less in structure 160 than in structure 140.

Thus, by separating the electrical and magnetic properties of a magnetic shield/electrode structure, it becomes possible to simultaneously optimize all four design goals for magnetic shield/electrode structures for use with a sensor, including a CPP MR sensor.

Although the present invention has been described with reference to preferred embodiments, workers skilled in the art will recognize that changes may be made in form and detail without departing from the spirit and scope of the invention.

The invention claimed is:

1. An apparatus comprising:
   a first electrode;
   a second electrode;
   a first magnetic shield comprising a first fragment that forms at least a portion of the first electrode and a second fragment that forms at least a portion of the second electrode;
   a second magnetic shield comprising a third fragment that forms at least a portion of the first electrode and a fourth fragment that forms at least a portion of the second electrode; and
   a sensor electrically connected in series between the first and second electrodes and positioned between the first and second magnetic shields, wherein each of the first and second magnetic shields has a first edge opposite a second edge, and wherein the sensor is adjacent the first edge of the first and second magnetic shields;
   wherein the first and second fragments of the first magnetic shield and the third and fourth segments of the second magnetic shield each extend from the first edge to the second edge.

2. The apparatus of claim 1 wherein the first and second edges of the first magnetic shield are substantially coplanar with a respective one of the first and second edges of the second magnetic shield.

3. The apparatus of claim 2 wherein each of the first and second magnetic shields further has a third edge substantially normal to the first edge and a fourth edge opposite the third edge, and wherein the third and fourth edges of the first magnetic shield are substantially coplanar with a respective one of the third and fourth edges of the second magnetic shield.

4. The apparatus of claim 1 wherein the third and fourth fragments of the second magnetic shield are separated by a gap having a width of less than 20 micrometers, wherein the gap electrically insulates the third fragment from the fourth fragment.

5. The apparatus of claim 1 wherein each of the first fragment of the first magnetic shield and the fourth fragment of the second magnetic shield has a width at the first edge greater than its width at the second edge.

6. The apparatus of claim 1 wherein an area of the first fragment of the first magnetic shield is substantially equal to an area of the fourth fragment of the second magnetic shield.

7. The apparatus of claim 1 wherein the magnetoresistive sensor is positioned between the first fragment of the first magnetic shield and the fourth fragment of the second magnetic shield.

8. An apparatus comprising:
   a first, second, third, and fourth fragment, each fragment extending from a first edge of the apparatus toward a second edge of the apparatus;
   a first magnetic shield comprising the first and second fragments coplanarly positioned with a first electrically insulating gap therebetween;
   a second magnetic shield comprising the third and fourth fragments coplanarly positioned with a second electrically insulating gap therebetween;

a first electrode comprising the first and third fragments and a first electrical contact positioned therebetween;

a second electrode comprising the second and fourth fragments and a second electrical contact positioned therebetween;

a magnetoresistive sensor electrically connected in series between the first and second electrodes and positioned adjacent the first edge between the first and second magnetic shields.

9. The apparatus of claim 8 wherein the first and second insulating gaps have a width of less than 20 micrometers.

10. The apparatus of claim 8 wherein a width at the first edge of the second and third fragments is less than a width at the second edge of the second and third fragments.

11. The apparatus of claim 8 wherein an area of the second fragment is substantially equal to an area of the third fragment.

12. The apparatus of claim 8 wherein the magnetoresistive sensor is positioned between the first and fourth fragments.

* * * * *

UNITED STATES PATENT AND TRADEMARK OFFICE
CERTIFICATE OF CORRECTION

PATENT NO. : 7,379,277 B2 Page 1 of 1
APPLICATION NO. : 11/172350
DATED : May 27, 2008
INVENTOR(S) : Daniel Paul Burbank et al.

It is certified that error appears in the above-identified patent and that said Letters Patent is hereby corrected as shown below:

Column 3, Line 2, delete "aback", insert --a back--

Column 6, Line 54 and 55, please remove the following words to a separate line, as it is a paragraph heading:

IV.    Capacitive Pickup of Noise

Signed and Sealed this

Second Day of September, 2008

JON W. DUDAS
*Director of the United States Patent and Trademark Office*